US012512584B2

(12) United States Patent
Zaid et al.

(10) Patent No.: US 12,512,584 B2
(45) Date of Patent: Dec. 30, 2025

(54) ELECTROMAGNETIC BANDGAP STRUCTURE

(71) Applicant: Huawei Technologies Co., Ltd., Shenzhen (CN)

(72) Inventors: Jamal Mohamed Ahmouda Zaid, Ottawa (CA); Ahmed Ashoor, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 18/123,187

(22) Filed: Mar. 17, 2023

(65) Prior Publication Data

US 2024/0313394 A1 Sep. 19, 2024

(51) Int. Cl.

*H01Q 1/52* (2006.01)
*H01Q 1/38* (2006.01)
*H01Q 1/50* (2006.01)

(52) U.S. Cl.

CPC ............... *H01Q 1/525* (2013.01); *H01Q 1/38* (2013.01); *H01Q 1/50* (2013.01)

(58) Field of Classification Search

CPC ...... H01Q 21/065; H01Q 1/38; H01Q 15/006; H01Q 9/0407; H01Q 15/008; H01Q 15/0086; H01Q 1/243; H01Q 1/48; H01Q 21/28; H01Q 9/0464; H01Q 5/40; H01Q 9/0435; H01Q 9/0457; H01Q 1/521; H01Q 9/0428; H01Q 15/14; H01Q 9/0414

See application file for complete search history.

(56) References Cited

U.S. PATENT DOCUMENTS

| | | | | |
|---|---|---|---|---|
| 11,682,846 | B2 * | 6/2023 | Dolatsha | H01Q 21/065 343/700 MS |
| 2006/0164309 | A1 * | 7/2006 | Fujishima | H01Q 1/38 343/700 MS |
| 2010/0171675 | A1 * | 7/2010 | Borja | H01Q 21/24 343/797 |
| 2019/0020110 | A1 * | 1/2019 | Paulotto | H01Q 5/392 |
| 2022/0294124 | A1 * | 9/2022 | Dolatsha | H01Q 1/48 |

OTHER PUBLICATIONS

“New EBG Solutions for Mutual Coupling Reduction”, Gonzalo Exposito-Dominguez, Jose Manuel Fernandez-Gonzalez, Pablo Padilla, Manuel Sierra-Castaner, EUCAP.2011.

“Mutual Coupling Reduction in Patch Antenna Arrays Using a UC-EBG Superstrate”, Hossein Sarbandi Farahani, Mehdi Veysi, Manouchehr Kamyab, and Alireza Tadjalli, IEEE Antennas and Wireless Propagation Letter vol. 9, 2010.

“Comparison of Circular, Square Cell and Hexagonal Cell Artificial Magnetic Conductors for Broadband Staggered Dipole Arrays with Low Profile”, Halim Boutayeb and Paul Watson, 11th European Conference on Antennas and Propagation (EUCAP), 2017.

* cited by examiner

*Primary Examiner* — Wei (Victor) Y Chan

(74) *Attorney, Agent, or Firm* — Troutman Pepper Locke LLP; Tim Tingkang Xia, Esq.

(57) ABSTRACT

An array includes an electromagnetic bandgap structure having a dielectric substrate and multiple conductive patches on the dielectric substrate and for suppressing surface waves travelling across the conductive patches. The conductive patches include a first conductive patch and a second conductive patch spaced from, and electromagnetically coupled to, the first conductive patch. The second conductive patch is shaped as a polygon comprising at least three corners.

11 Claims, 8 Drawing Sheets

ELECTROMAGNETIC BANDGAP STRUCTURE

FIELD

The present disclosure relates to communications systems and in particular to an electromagnetic bandgap structure.

BACKGROUND

Half-duplex communication systems operate at different frequency bands for both the transmitter and the receiver, resulting in a communication delay as well as a crowded spectrum. On the other hand, full-duplex communication systems support simultaneous transmission and reception at the same frequency band. This can improve the attainable spectral efficiency by a factor of two (i.e. throughput may be increased by a factor of two). In full-duplex systems, in order to overcome the inherent self-interference between the transmitted and received signals, high isolation between the transmit and receive antennas is required. Improving the isolation between the transmit and receive antennas, therefore, is an important and attractive topic for researchers, and many techniques have been studied and proposed.

For example, some solutions have proposed the use of defected ground structures, parasitic elements, and near-field resonators. While these solutions have shown noticeable isolation improvements, electromagnetic bandgap (EBG) structures, and frequency-selective surface (FSS) structures, have recently gained attention. However, such solutions tend to have a narrow-band operating frequency with improvements in isolation not exceeding 10 dB. Another disadvantage with existing solutions is that some isolation structures are bulky and require multi-layering as well as vias, making their manufacture more complicated and less cost-effective.

SUMMARY

According to a first aspect of the disclosure, there is provided an array comprising an electromagnetic bandgap structure comprising: a dielectric substrate; and multiple conductive patches on the dielectric substrate and for suppressing surface waves travelling across the conductive patches, including: a first conductive patch; and a second conductive patch spaced from, and electromagnetically coupled to, the first conductive patch, wherein the second conductive patch is shaped as a polygon comprising at least three corners. As a result, surface currents may be accumulated and concentrated in the corners of the polygonal patch, which may contribute to the stop gap of the electromagnetic bandgap structure.

The dielectric substrate and the multiple conductive patches may define a frequency-selective surface.

The polygon may comprise no more than seventy-two corners. The polygon may comprise no more than sixteen corners. As the polygon approaches the shape of a circle, the suppression of surface currents may be reduced. Therefore, an upper limit on the number of corners of the polygon may, according to some embodiments, be useful.

The polygon may be an octagon comprising sixteen corners. The sixteen corners may comprise eight inner corners, each defining an angle of 135°, and eight outer corners, each defining an angle of 90°.

An outer perimeter of the first conductive patch may be square-shaped.

The conductive patches may be co-planar. According to some embodiments, the electromagnetic bandgap structure may not comprise any vias. Therefore, the electromagnetic bandgap structure may be compatible and relatively easy to fabricate with PCB technology. For example, according to some embodiments, the dielectric substrate may comprise a top layer of a printed circuit board.

The first conductive patch may comprise an aperture with a shape corresponding to a shape of the second conductive patch. The second conductive patch may be positioned within the aperture such that a slot gap is defined between an edge of the aperture and an edge of the second conductive patch.

The array may comprise a plurality of electromagnetic bandgap structures, wherein the plurality of electromagnetic bandgap structures comprise the electromagnetic bandgap structure, and wherein adjacent electromagnetic bandgap structures of the plurality of electromagnetic bandgap structures are spaced from one another by a gap.

According to a further aspect of the disclosure, there is provided a full-duplex transceiver comprising: a transmitter operable to transmit electromagnetic waves at an operating frequency; a receiver operable to receive electromagnetic waves at the operating frequency; and an electromagnetic bandgap structure positioned between the transmitter and the receiver and for reducing interference between the transmitter and the receiver, the electromagnetic bandgap structure comprising: a dielectric substrate; and multiple conductive patches on the dielectric substrate and for suppressing surface waves travelling across the conductive patches, including: a first conductive patch; and a second conductive patch spaced from, and electromagnetically coupled to, the first conductive patch, wherein the second conductive patch is shaped as a polygon comprising at least three corners.

The electromagnetic bandgap structure may be configured to provide isolation between the transmitter and the receiver of up to 14.8 dB. The electromagnetic bandgap structure may be configured to provide isolation between the transmitter and the receiver of up to 14.8 dB across a fractional bandwidth of 31%. Such isolation is a significant improvement over existing electromagnetic bandgap structures and frequency-selective surface structures.

According to a further aspect of the disclosure, there is provided a method of tuning an electromagnetic bandgap structure, the electromagnetic bandgap structure comprising: a dielectric substrate; and multiple conductive patches on the dielectric substrate and for suppressing surface waves travelling across the conductive patches, including: a first conductive patch; and a second conductive patch spaced from, and electromagnetically coupled to, the first conductive patch, wherein the second conductive patch is shaped as a polygon comprising at least three corners; and the method comprising: adjusting one or more of: the spacing between the first conductive patch and the second conductive patch; an angle defined by each corner; and the number of corners in the polygon.

The electromagnetic bandgap structure may be comprised in an array of electromagnetic bandgap structures, wherein the electromagnetic bandgap structure is spaced from adjacent electromagnetic bandgap structures by a gap; and the adjusting may comprise adjusting one or more of: the spacing between the first conductive patch and second conductive patch; the angle defined by each corner; the gap; and the number of corners in the polygon.

As a result, the operating frequency of the electromagnetic bandgap structure may be tuned according to the application in which the electromagnetic bandgap structure is being used.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

The present disclosure seeks to provide a novel electromagnetic bandgap structure providing improved isolation over a wide bandwidth. While various embodiments of the disclosure are described below, the disclosure is not limited to these embodiments, and variations of these embodiments may well fall within the scope of the disclosure which is to be limited only by the appended claims.

Generally, embodiments of the disclosure relate to electromagnetic bandgap (EBG) structures comprising a dielectric substrate and multiple conductive patches on the dielectric substrate, for suppressing surface waves travelling across the conductive patches. The conductive patches include at least two patches, and in particular at least a first conductive patch and a second conductive patch spaced from, and electromagnetically coupled to, the first conductive patch. The second conductive patch is shaped as a polygon comprising at least three corners.

According to some embodiments, the dielectric substrate and the multiple conductive patches define together a frequency-selective surface.

According to one particular embodiment described in further detail below, the polygon comprises sixteen corners (i.e. the polygon is an octagon). Generally, the closer the polygon approaches the shape of a circle, the less the suppression. Therefore, according to some embodiments, the polygon may comprise no more than seventy-two corners.

According to some embodiments, the electromagnetic bandgap structure with a frequency-selective surface may suppress surface waves by up to 14.8 dB across its entire operating band, which according to some embodiments may be a bandwidth of 1.1 GHz from 3.1 GHz to 4.2 GHz.

According to some embodiments, the electromagnetic bandgap structure may be implemented between two antennas (e.g. a transmit antenna and a receive antenna) in a full-duplex transceiver. The electromagnetic bandgap structure may therefore reduce the mutual coupling between the two antennas.

Embodiments of the electromagnetic bandgap structure described herein may furthermore be implemented in a planar structure that is fully compatible and relatively easy to fabricate with PCB technology.

Figures 1A, 1B:
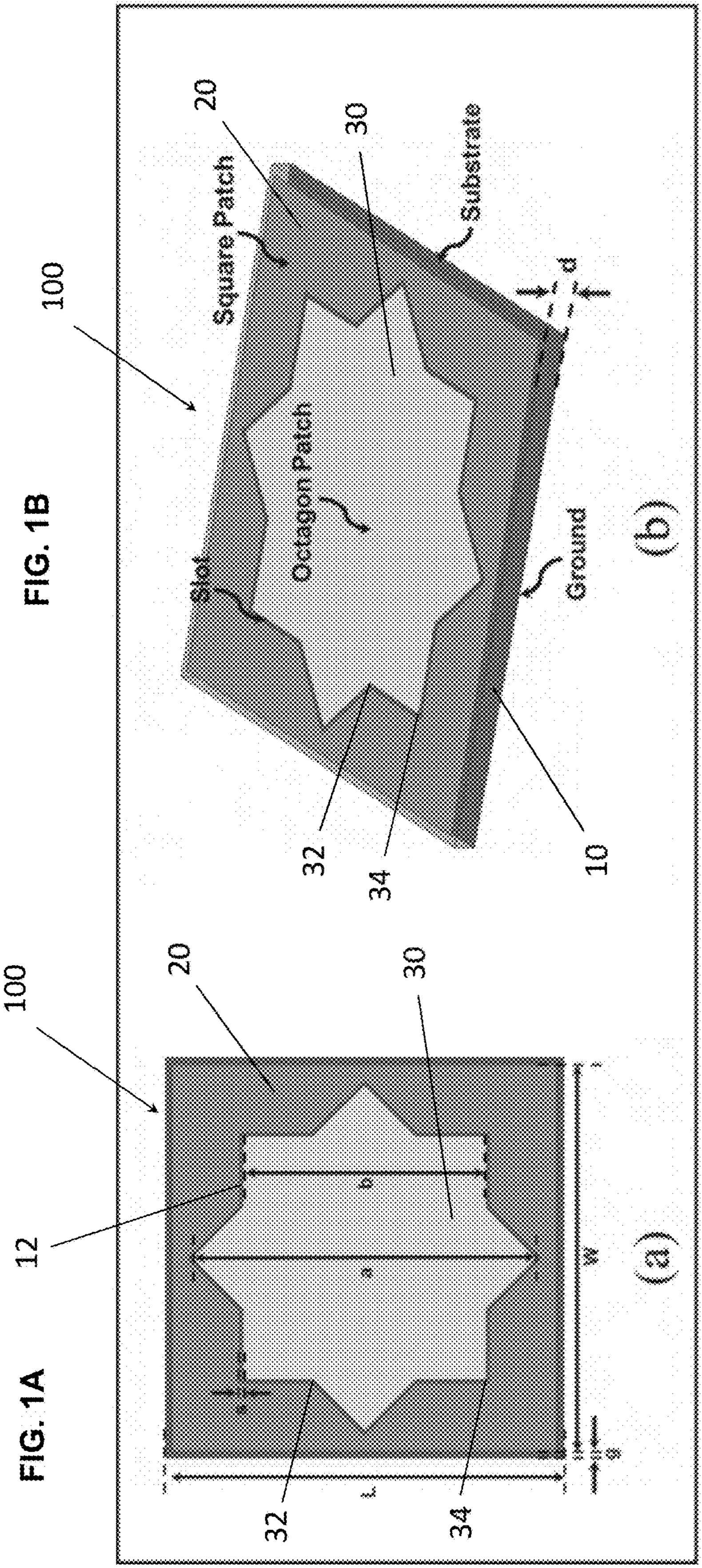
FIG. 1A is a top view of an electromagnetic bandgap structure according to an embodiment of the disclosure.
FIG. 1B is a perspective view of the electromagnetic bandgap structure of FIG. 1A, according to an embodiment of the disclosure.

Turning to FIGS. 1A and 1B, there are shown different views of an electromagnetic bandgap (EBG) structure 100 according to an embodiment of the disclosure. EBG structure 100 comprises a dielectric substrate 10 of thickness d and upon which is provided a frequency-selective surface (FSS) comprising electromagnetically coupled conductive patches 20 and 30. Conductive patch 20 comprises a square perimeter and an octagon-shaped recess defined therein. Conductive patch 30 is octagon-shaped and is located within the correspondingly-shaped recess of patch 20. A slot gap 12 is defined between the outer perimeter of patch 30 and the inner perimeter of patch 20 (as defined by the recess within patch 20). Octagon-shaped patch 30 comprises eight inner corners 32 and eight outer corners 34 (sixteen corners in total).

EBG structure 100 has a length L=35.5 mm. Patch 20 has sides of length W=34.34 mm whereas octagon patch 30 has dimensions a=30.61 mm and b=21.65 mm, with angles of 135° defined by inner corners 32 and 90° defined by outer corners 34. Slot gap 12 has a size s=0.25 mm. Patches 20 and 30 are patterned on grounded dielectric substrate 10 of a dielectric constant (DK) of 3.66 with a loss tangent of 0.004 and a dielectric thickness of d=1.524 mm. As the skilled person will recognize, depending on the particular desired properties of the EBG structure (for example, the desired stop band), the EBG structure will have different dimensions.

As described above, a major property of EBG structures is their ability to suppress surface waves. EBGs can therefore be used as stop bands by eliminating interfering surface currents arising from neighbouring elements, hence improving the isolation and reducing coupling effects between the elements. The stop band of an EBG structure can be generated using numerical simulation tools. The dispersion diagram for EBG structure 100 is shown in FIG. 2A and was extracted by using a finite-element High-Frequency Structure Simulator (HFSS) solver.

Figures 2A, 2B:
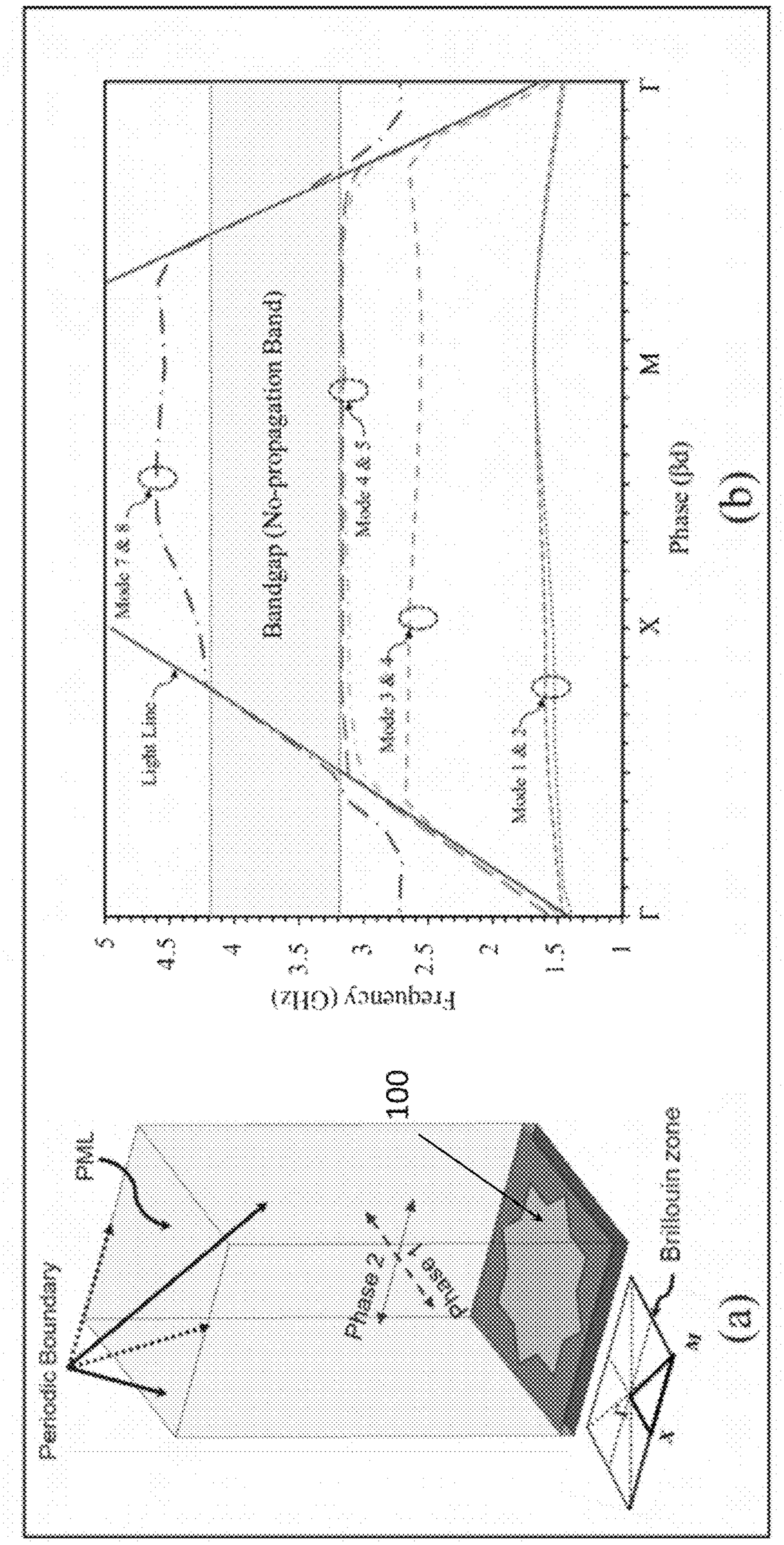
FIG. 2A is a schematic view of a high-frequency structure simulator setup, according to an embodiment of the disclosure.
FIG. 2B is a dispersion diagram for the electromagnetic bandgap structure of FIGS. 1A and 1B, according to an embodiment of the disclosure.

The HFSS setup shown in FIG. 2A was implemented to extract the bandgap of EBG structure 100, showing the computational domain and boundary conditions (irreducible Brillouin zone) for EBG structure 100. The dispersion diagram shown in FIG. 2B shows the relationship between wave numbers and frequency, and presents the propagating modes and bandgap(s) that exist between different modes. A gap between the upper limit of one propagation mode and the intersection with the light line (free-space propagation) with the next propagation mode represents a region where EBG structure 100 prevents any propagation. An electromagnetic bandgap is observed between 3.1 GHZ and 4.2 GHz for EBG structure 100, as shown in FIG. 2B.

The operating frequency (i.e. the bandgap) of EBG structure 100 can be tuned by controlling slot gap 12 between patches 20 and 30, and/or the angles defining corners 32 and 34 of patch 30, and/or the number of corners (i.e. the shape of the polygon). The operating frequency may be further tuned based on the gap separating adjacent EBG structures in an array of EBG structures, as described in further detail below in connection with FIG. 3A. EBG structure 100 can operate on a wide range of frequencies, in particular the lower and mm-wave of 5G frequencies.

Figures 3A, 3B:
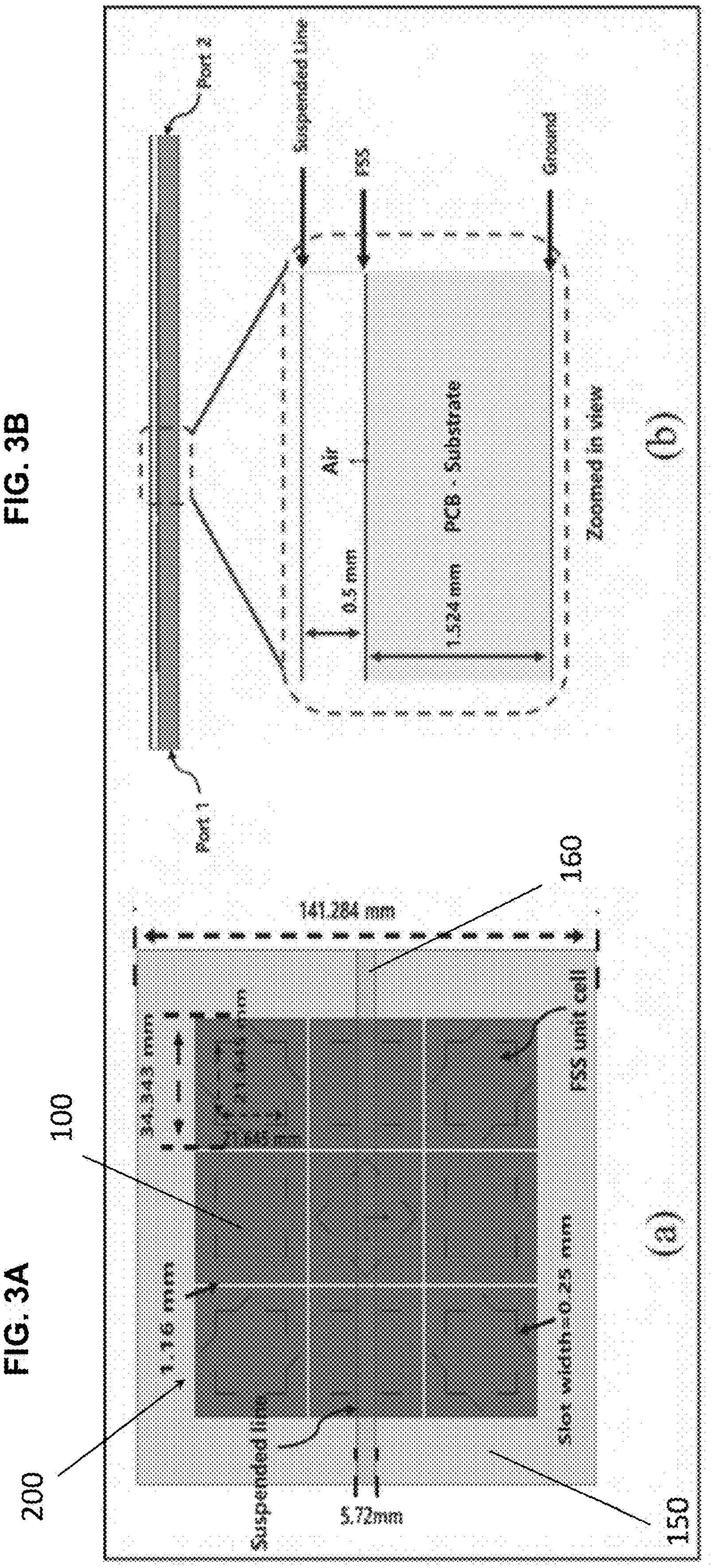
FIG. 3A is a top view of a suspended transmission line above an array of electromagnetic bandgap structures, according to an embodiment of the disclosure.
FIG. 3B is a side view of the suspended transmission line above the array of electromagnetic bandgap structures of FIG. 3A, according to an embodiment of the disclosure.

Turning to FIG. 3A, there is shown a suspended line test with a 3×3 array 200 of EBG structures 100 printed on a square PCB substrate 150 with a length of 141.284 mm, a dielectric constant of 3.66, and a thickness=1.524 mm. A suspended transmission line 160 of a width of 5.72 mm is placed above array 200 with a spacing of 0.5 mm, as illustrated in FIG. 3B. Adjacent EBG structures 100 are spaced by a gap of 1.16 mm.

Figure 4:
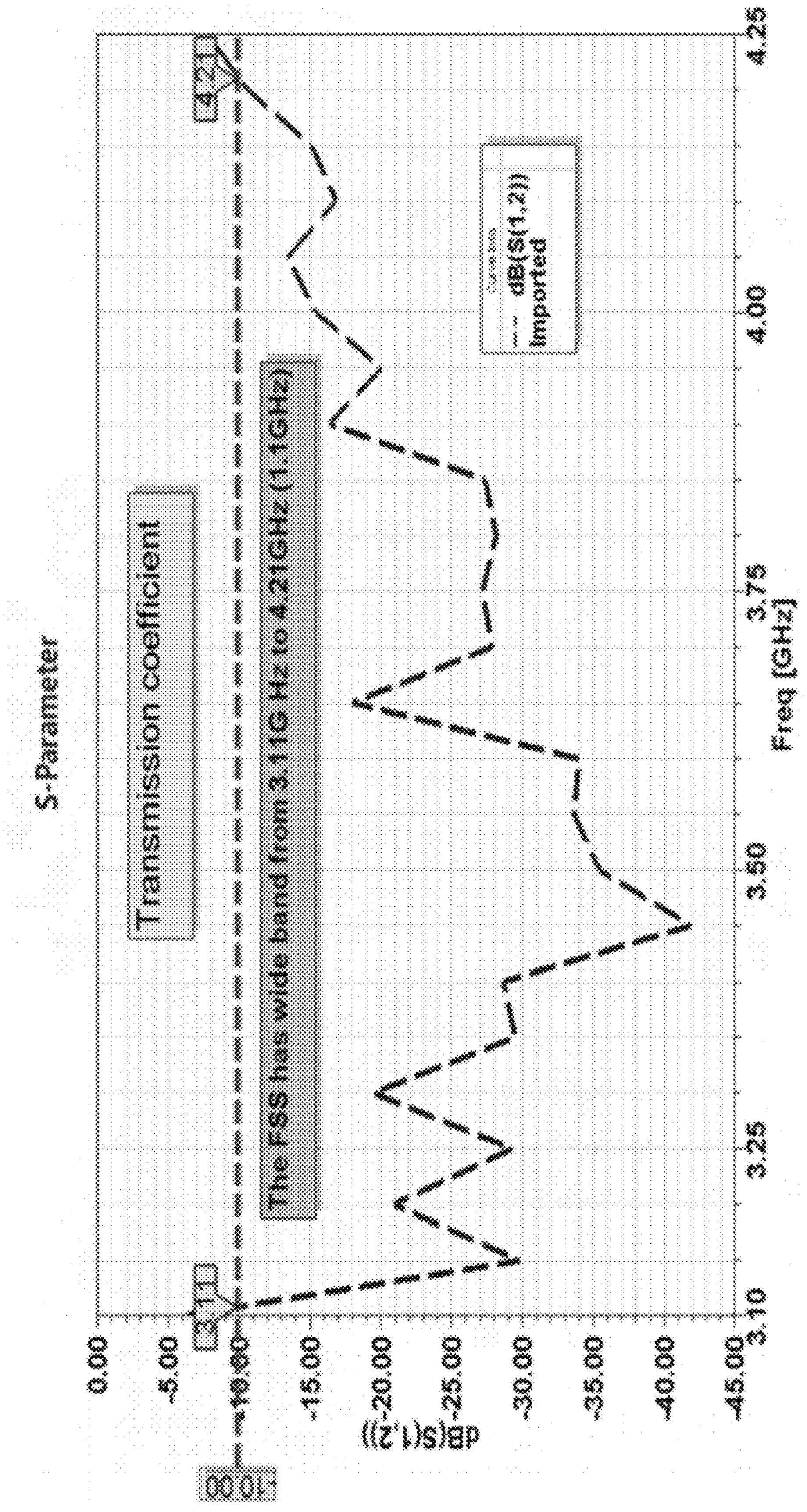
FIG. 4 is a plot of scattering parameter as a function of frequency for the embodiment of FIGS. 3A and 3B.

The simulated transmission coefficient of suspended transmission line 160 placed above array 200 is shown in FIG. 4. The simulation result shows that EBG structures 100 function as a stop band that suppresses the surface waves within the bandgap frequencies of EBG structures 100. The result shown in FIG. 4 is in full agreement with the one obtained from the above dispersion diagram (FIG. 2B) showing a stop band of about 1.1 GHZ (3.11 GHz to 4.21 GHz), giving about 31% fractional bandwidth.

The degree of improvement in isolation that EBG structure 100 is able to achieve was also investigated. In this scenario, two antennas were considered and tested against three cases. For all three cases, constant spacing of 141.284 mm between the antennas was used.

Figure 5:
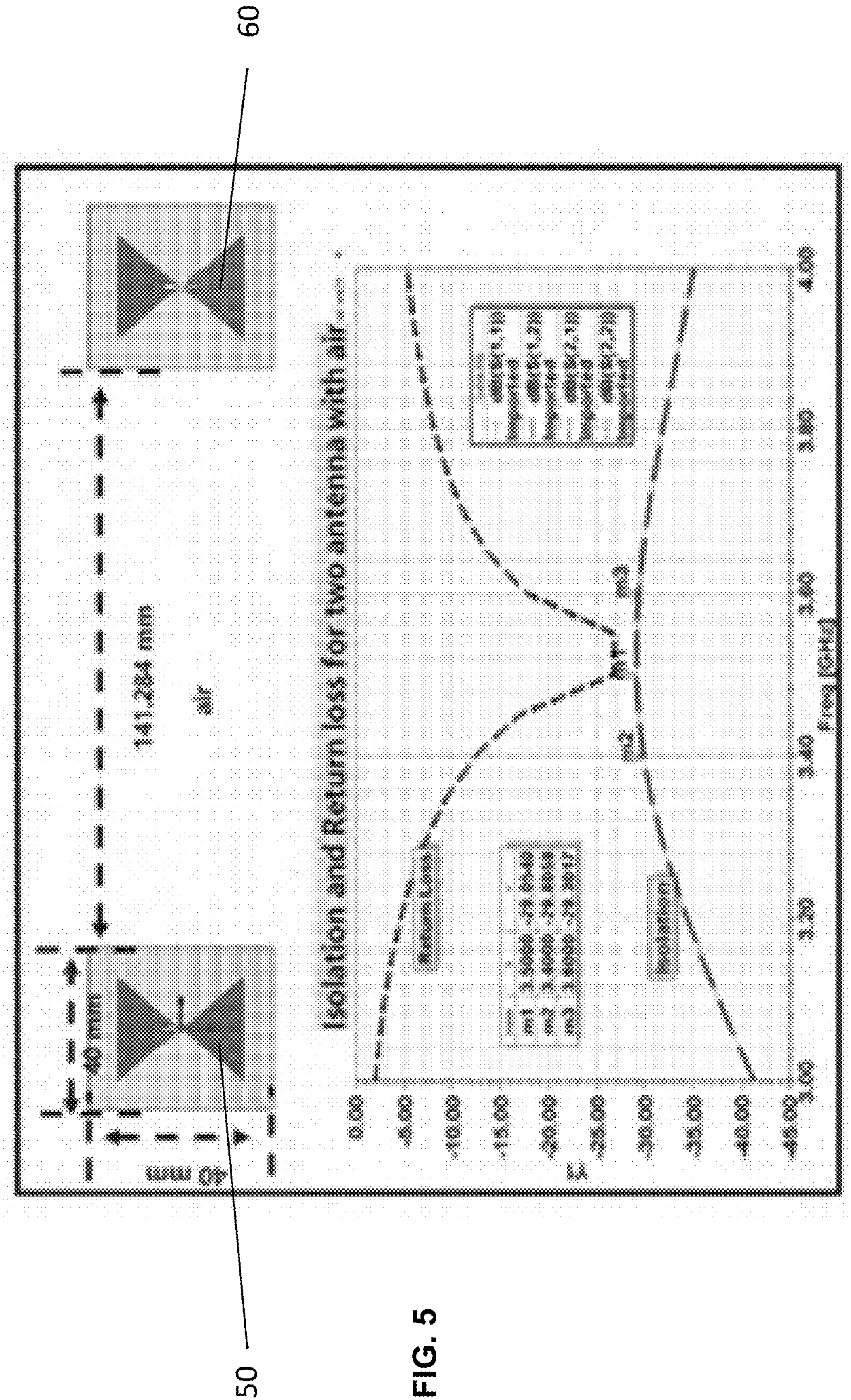
FIG. 5 is a plot of scattering parameter as a function of frequency for two antennas separated by a medium of air, according to an embodiment of the disclosure.

Case #1: an air medium is used between the two antennas 50 and 60, resulting in an isolation of 29 dB as shown in FIG. 5.

Figure 6:
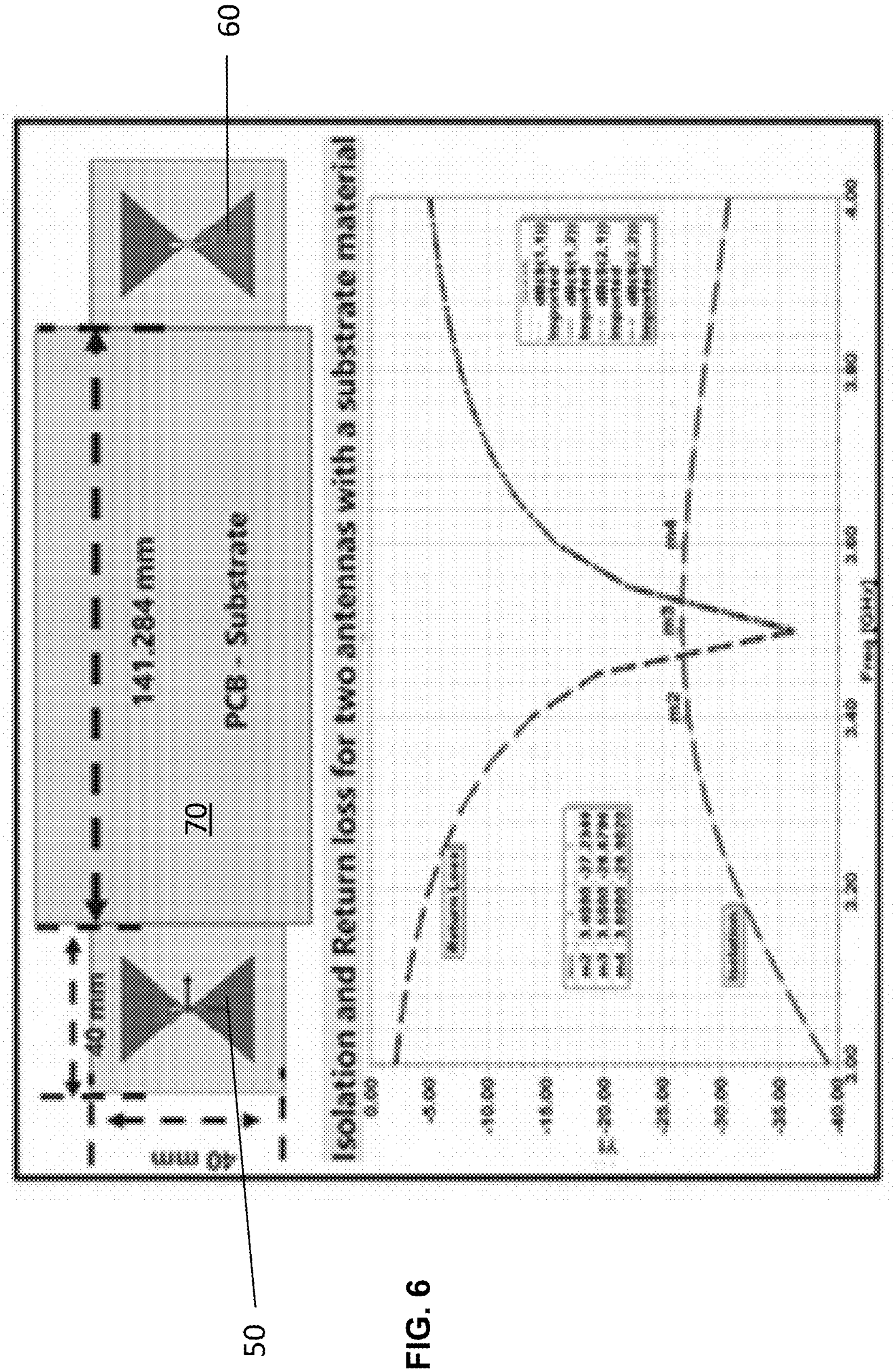
FIG. 6 is a plot of scattering parameter as a function of frequency for two antennas separated by the electromagnetic bandgap structure of FIGS. 1A and 1B, according to an embodiment of the disclosure.

Case #2: a substrate 70 of dielectric constant=3.66 is inserted between the two antennas 50 and 60, resulting in an isolation of 26 dB as shown in FIG. 6.

Figure 7A:
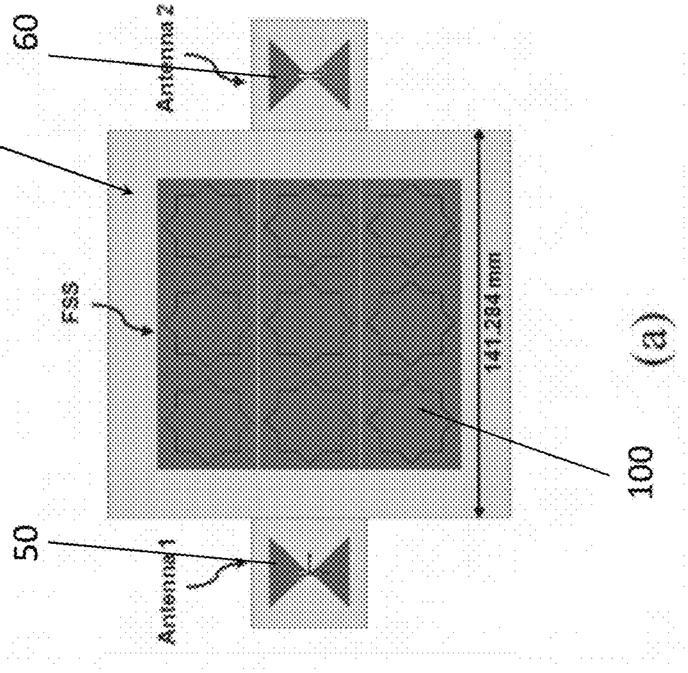
FIG. 7A is a top view of an array of electromagnetic bandgap structures positioned between two antennas, according to an embodiment of the disclosure.
Figure 7B:
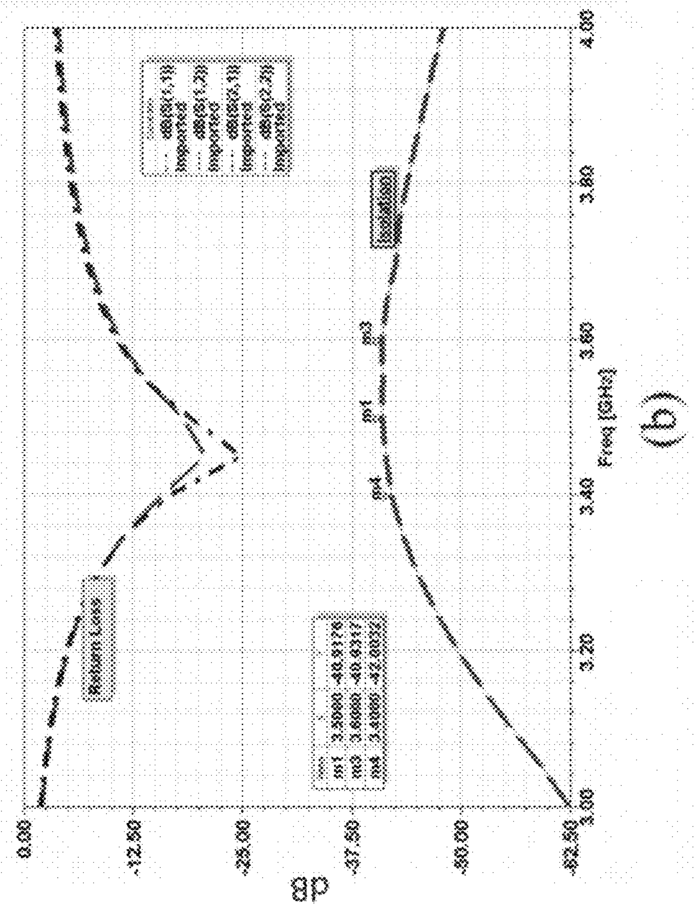
FIG. 7B is a plot of scattering parameter as a function of frequency for the embodiment of FIG. 7A, according to an embodiment of the disclosure.

Case #3: 3×3 array 200 of EBG structures 100 is inserted between the two antennas 50 and 60 as shown in FIG. 7A. The s-parameter result shown in FIG. 7B demonstrates that EBG structures 100 function as a stop band throughout their bandgap such that there is negligible surface wave propagation between antennas 50 and 60. The isolation between antennas 50 and 60 is improved and has a minimum of 40.9 dB.

The below Table 1 summarizes the results of these three test cases. As can be seen, the differences in average isolation between Case #3 and Cases #1 and #2 are 12 dB and 14.4 dB, respectively.

TABLE 1

| Frequancy No. | Case # 1 with air (dB) | Case # 2 with PCB (dB) | Case # 3 with FSS (dB) | Isolation difference Case # 1 & Case # 3 (dB) | Isolation difference Case # 2 & Case # 3 (dB) |
|---|---|---|---|---|---|
| 3400 MHz | 30 | 27.2 | 42 | 12 | 14.8 |
| 3500 MHz | 29 | 26.8 | 41 | 12 | 14.2 |
| 3600 MHz | 29 | 26.8 | 41 | 12 | 14.2 |

Figures 8A, 8B:
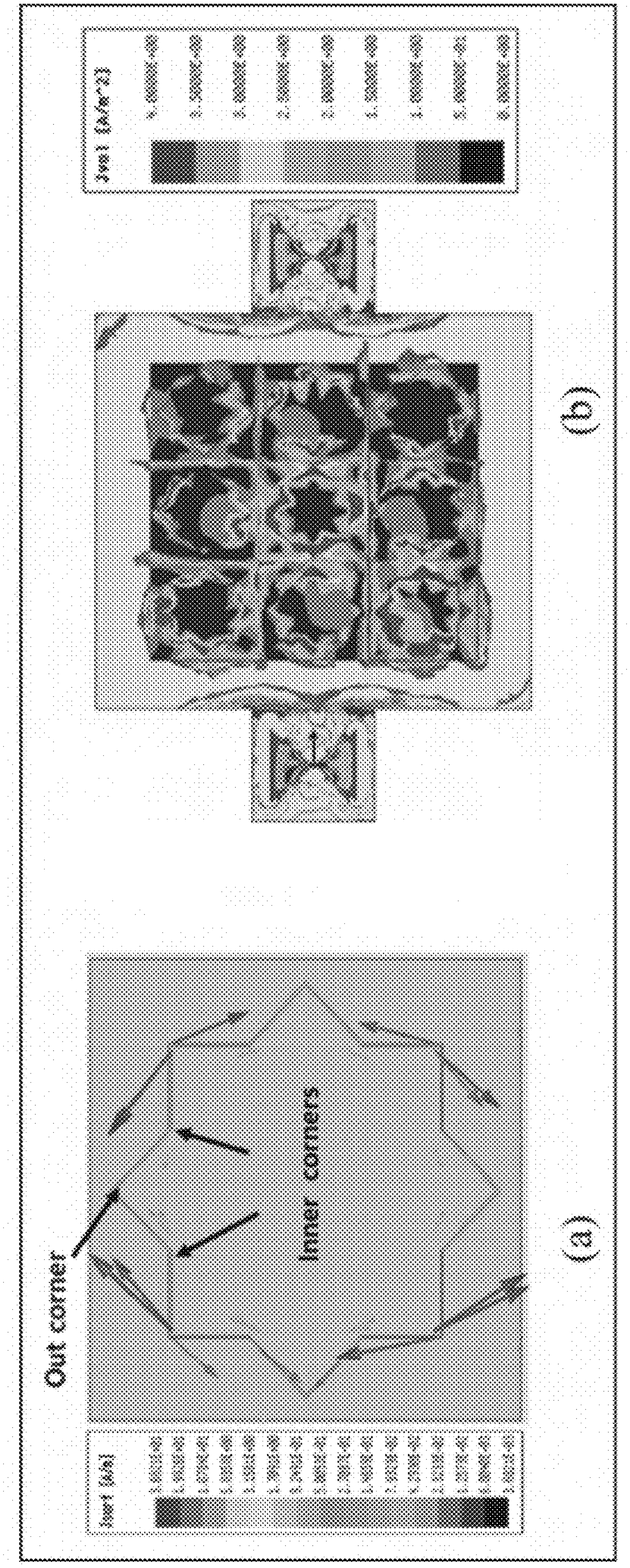
FIG. 8A shows surface currents across the electromagnetic bandgap structure of FIGS. 1A and 1B, according to an embodiment of the disclosure.
FIG. 8B shows surface currents across the array of electromagnetic bandgap structures of FIG. 7A, according to an embodiment of the disclosure.

As can be seen, an advantage of embodiments of the EBG structures described herein is their ability to suppress surface waves travelling across their surface, by accumulating and concentrating the developed surface currents in the outer and inner corners of the polygonal patch (e.g. corners 32 and 34 of patch 30), as shown in FIGS. 8A and 8B. This creates a bandgap region with negligible propagation across the entire bandgap.

As described above, although EBG structure 100 includes an octagon-shaped patch 30, the disclosure extends to EBG structures having any other suitably-shaped polygon patches, including triangular-shaped patches, square-shaped patches, pentagonal-shaped patches, hexagonal-shaped patches, etc. In this context, it is expected that, according to some embodiments, acceptable isolation may be achieved with patches having thirty-six sides (and, in particular, with the corners defining angles of) 170°.

As a result, embodiments of the EBG structures described herein may be used to reduce coupling between any highly-coupled components, and may be useful for wideband frequency applications that require high isolation. In addition, because of their planar nature, certain embodiments of the EBG structures described herein may be easily incorporated into PCB technology, The described EBG structures may be particularly suited to full-duplex 5G & 6G applications and may be easily inserted between transceiver antennas for the reduction of mutual coupling. Furthermore, different shapes of printed antennas or components can benefit from the relatively high isolations achieved by the EBG structures described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. An array comprising an electromagnetic bandgap structure comprising:

a dielectric substrate; and multiple conductive patches on the dielectric substrate and for suppressing surface waves travelling across the conductive patches, including:

a first conductive patch; and a second conductive patch spaced from, and electromagnetically coupled to, the first conductive patch, wherein the second conductive patch is shaped as a polygon comprising at least three corners, wherein:

the first conductive patch comprises an aperture with a shape corresponding to a shape of the second conductive patch; and the second conductive patch is positioned within the aperture such that a slot gap is defined between an edge of the aperture and an edge of the second conductive patch.

2. The array of claim 1, wherein the dielectric substrate and the multiple conductive patches define a frequency-selective surface.

3. The array of claim 1, wherein the polygon comprises no more than seventy-two corners.

4. The array of claim 1, wherein the polygon comprises no more than sixteen corners.

5. The array of claim 1, wherein the polygon is an octagon comprising sixteen corners.

6. The array of claim 5, wherein the sixteen corners comprise eight inner corners, each defining an angle of 135°, and eight outer corners, each defining an angle of 90°.

7. The array of claim 1, wherein an outer perimeter of the first conductive patch is square-shaped.

8. The array of claim 1, wherein the conductive patches are co-planar.

9. The array of claim 1, wherein the electromagnetic bandgap structure does not comprise any vias.

10. The array of claim 1, wherein the dielectric substrate comprises a top layer of a printed circuit board.

11. The array of claim 1, wherein the array comprises a plurality of electromagnetic bandgap structures, wherein the plurality of electromagnetic bandgap structures comprise the electromagnetic bandgap structure, and wherein adjacent electromagnetic bandgap structures of the plurality of electromagnetic bandgap structures are spaced from one another by a gap.

* * * * *